United States Patent
Park

(10) Patent No.: US 7,868,911 B2
(45) Date of Patent: Jan. 11, 2011

(54) SURVEILLANCE CAMERA CAPABLE OF ADJUSTING POSITION AND A CONTROLLING METHOD THEREOF

(75) Inventor: Eun-young Park, Siheung-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 1116 days.

(21) Appl. No.: 10/983,724

(22) Filed: Nov. 9, 2004

(65) Prior Publication Data

US 2006/0098092 A1 May 11, 2006

(51) Int. Cl.
*H04N 7/18* (2006.01)

(52) U.S. Cl. .................................................. 348/143
(58) Field of Classification Search ................. 348/143
See application file for complete search history.

(56) References Cited

U.S. PATENT DOCUMENTS

| | | | | |
|---|---|---|---|---|
| 4,337,482 A | * | 6/1982 | Coutta | 348/159 |
| 4,945,367 A | * | 7/1990 | Blackshear | 396/427 |
| 5,168,364 A | * | 12/1992 | Kondo et al. | 348/230.1 |
| 5,801,770 A | * | 9/1998 | Paff et al. | 348/211.5 |
| 6,027,257 A | | 2/2000 | Richards et al. | |
| 6,803,946 B1 | * | 10/2004 | Wakiyama et al. | 348/211.6 |
| 7,312,814 B2 | * | 12/2007 | Bopp | 348/159 |
| 2001/0045991 A1 | | 11/2001 | Van Rens et al. | |
| 2005/0057656 A1 | * | 3/2005 | Chardon et al. | 348/207.99 |

FOREIGN PATENT DOCUMENTS

| | | |
|---|---|---|
| JP | 04-081081 | 3/1992 |
| KR | 010056420 | 7/2001 |
| KR | 2002-78896 | 10/2002 |
| KR | 1020020078896 | 10/2002 |

OTHER PUBLICATIONS

Official Action issued by the Korean Intellectual Property Office on May 26, 2005 in Korean Patent Application No. 2003-13126.

* cited by examiner

*Primary Examiner*—Y. Lee
*Assistant Examiner*—Richard Torrente
(74) *Attorney, Agent, or Firm*—Sughrue Mion, PLLC

(57) ABSTRACT

A surveillance camera capable of adjusting a position thereof, and a controlling method thereof are disclosed. The surveillance camera capable of adjusting a position to photograph or capture video images of a monitored area by adaptively driving a camera part in accordance with a predetermined monitoring mode selected by an external controller, includes a pan sensor detecting a standard position of a pan motor that transversely rotates the camera part; a tilt sensor detecting a standard position of a tilt motor that perpendicularly rotates the camera part; and a control part outputting a driving control signal for driving the pan motor and/or the tilt motor, adaptively, according to the received monitoring mode selecting signal, such that standard positions of the pan motor and/or the tilt motor are detected respectively by the pan sensor and/or the tilt sensor by a certain period set according to the monitoring mode. Accordingly, positions of the pan motor and the tilt motor are adaptively initialized during the operation thereof, and therefore, position error caused by loss of driving pulse can be compensated, thereby enabling more correct monitoring work.

20 Claims, 5 Drawing Sheets

SURVEILLANCE CAMERA CAPABLE OF ADJUSTING POSITION AND A CONTROLLING METHOD THEREOF

BACKGROUND OF THE INVENTION

1. Field of the Invention

The present invention relates to a surveillance camera capable of adjusting a position thereof and a method of controlling the same. More particularly, the present invention relates to a surveillance camera capable of correctly adjusting its position by adaptively initializing positions of a pan motor and a tilt motor while they are being driven, and a method of controlling the same.

2. Description of the Related Art

A speed dome camera, an example of a closed-circuit television (CCTV) monitoring system, moves transversely and perpendicularly by pan and tilt functions and detects any movement within a monitored area. The speed dome camera is generally mounted in a hemisphere or sphere shaped housing.

The pan function is for transversely panning a camera by a pan motor through a substantially 360-degree range, and a tilt function is for perpendicularly panning the camera by a tilt motor through a substantially 90-degree range. The monitored area is expandable by the pan and tilt functions.

A stepping motor capable of varying a speed thereof is used as the pan motor and the tilt motor. A rotating direction and a speed can be adjusted in accordance with a step, that is, a driving pulse, output from a controller of the dome camera.

The dome camera is provided with a pan sensor and a tilt sensor for position initialization of the pan motor and the tilt motor. When the dome camera is turned on, the pan motor moves from a current position to a pan sensor position, and the tilt motor moves from a current position to a tilt sensor position in a certain direction, thereby initializing a counter of the driving pulse. That is, the counter is initialized after the dome camera is on. This is because positions of the pan motor and the tilt motor are determined according to the counter of the driving pulse, thereby driving the dome camera adaptively.

FIG. 1 shows a pan motor 10 of a dome camera rotating clockwise (CW) or counterclockwise (CCW) through a substantially 360-degree range. When a standard position detected by a pan sensor 12 corresponds to a current position P1, with the dome camera turned on, the pan motor 10 moves so that the standard position thereof is detected by the pan sensor 12.

When the standard position of the pan motor 10 is detected by the pan sensor 12, and the counter of the driving pulse is initialized, the pan motor 10 rotates back until the standard position thereof corresponds to the current position P1 and performs a monitoring function, rotating CW or CCW according to the output driving pulse. The dome camera detects the position of the pan motor 10 as rotated, based on a value of the counter of the driving pulse, and outputs a driving pulse for moving to a next position P2.

For example, assuming that the driving pulse required for the standard position of the pan motor 10 to move from the current position P1 to the next position P2 is 90 after the initialization of the driving pulse counter, the dome camera outputs 90 as the driving pulse to the pan motor 10. Therefore, if the driving pulse counter is 90, the dome camera determines the standard position of the pan motor 10 to correspond to the next position P2 and outputs a driving pulse for moving to another next position P3. The position initialization and the output of the driving pulse of the pan motor 10 are applied in almost the same manner in the tilt motor and are not separately illustrated.

However, since the conventional camera applies the stepping motor, operated in accordance with the driving pulse, for the pan motor 10 and the tilt motor, loss of the driving pulse occurs when operating the pan motor 10 and the tilt motor. The loss is induced when changing the speed or the rotating direction of the pan motor 10 and/or the tilt motor. As the numbers of losses are accumulated, the pan motor 10 and/or the tilt motor would fail to correctly move to desired positions corresponding to the output driving pulse.

In other words, the conventional dome camera initializes only the driving pulse counter of the pan motor 10 and the tilt motor, but does not reinitialize the positions of the pan motor 10 and the tilt motor although the error caused by the loss of the driving pulse is accumulated. Therefore, the pan motor 10 and the tilt motor cannot be correctly placed within the monitored area, and accordingly, photographing or video capture of the monitored area where monitoring is required by a user cannot be completely, consistently or accurately performed.

SUMMARY OF THE INVENTION

An aspect of the present invention is to provide a surveillance camera capable of adaptively adjusting a position error of a pan motor and a tilt motor according to a monitoring mode, the error caused by loss of a driving pulse as a speed or a rotating direction of the pan motor and the tilt motor change, and a method for controlling the same.

In order to achieve the above-described aspects of the present invention, there is provided a surveillance camera capable of adjusting a position for photographing a monitored area by adaptively driving a camera part in accordance with a predetermined monitoring mode selected by an external controller, including a pan sensor for detecting a standard position of a pan motor that transversely rotates the camera part; a tilt sensor for detecting a standard position of a tilt motor that perpendicularly rotates the camera part; and a control part for outputting a driving control signal for driving the pan motor and/or the tilt motor, adaptively, according to the received monitoring mode selecting signal, such that standard positions of the pan motor and/or the tilt motor are detected respectively by the pan sensor and/or the tilt sensor by a certain period set according to the monitoring mode.

In an aspect of the present invention, if the received monitoring mode selecting signal is a preset mode signal, which is a mode in which a plurality of preset monitored areas are sequentially monitored, the control part outputs to the motor driver the driving control signal such that the camera part passes through the plurality of monitored areas along a certain path, and when the standard positions of the pan motor and/or the tilt motor are not detected respectively by the pan sensor and/or the tilt sensor, the control part outputs to motor driver the driving control signal such that the standard positions of the pan motor and/or the tilt motor are detected by the pan sensor and/or the tilt sensor, respectively.

In an aspect of the present invention, if the received monitoring mode selecting signal is an auto-panning mode signal, which is a mode monitoring two preset monitored areas by reciprocal movement, the control part outputs the driving control signal such that the camera part traverses between the two monitored areas by the reciprocal movement and counts each reciprocal movement, and when the counted number of the reciprocal movements is equal to or greater than a standard number of the reciprocal movement, which is preset, the control part outputs the driving control signal to the motor driver, such that the standard positions of the pan motor and/or the tilt motor are detected by the pan sensor and/or the tilt sensor, respectively. The external controller varies the standard number of the reciprocal movement.

In an aspect of the present invention, if the received monitoring mode selecting signal is a pattern mode signal, in which an operation pattern of the camera part, operated for a certain time and stored by the external controller, is performed, the control part outputs the driving control signal such that the camera part operates corresponding to the stored operation pattern and counts the number of performing the operation pattern. If the counted number is equal to or greater than a standard number of performing the operation pattern, which is preset, the control part outputs the driving control signal to the motor driver such that the standard positions of the pan motor and/or the tilt motor are detected by the pan sensor and/or the tilt sensor.

In an aspect of the present invention, when the surveillance camera is turned on, the control part rotates the pan motor and/or the tilt motor from an initial position in a certain direction such that the standard positions of the pan motor and/or the tilt motor are detected by the pan sensor and/or the tilt sensor, respectively, and when the standard position detecting signal for the pan motor and/or the tilt motor is received, the control part outputs the driving control signal to the motor driver such that the pan motor and/or the tilt motor are rotated back to the initial position.

Another aspect of the present invention is to provide a method of controlling a surveillance camera which is capable of adjusting a position for photographing a monitored area by adaptively driving a camera part according to a predetermined monitoring mode selected by an external controller, the method including rotating the pan motor and/or the tilt motor from an initial position in a certain direction such that standard positions of the pan motor that transversely rotates the camera and the tilt motor that perpendicularly rotates the camera are detected by the pan sensor and/or the tilt sensor, respectively, when the surveillance camera is turned on; rotating the pan motor and/or the tilt motor back to the initial position when the pan motor and/or the tilt motor are detected by the pan sensor and/or the tilt sensor; and adaptively driving the pan motor and/or the tilt motor according to the selected monitoring mode, such that standard positions of the pan motor and/or the tilt motor are detected respectively by the pan sensor and/or the tilt sensor by a certain period set according to the monitoring mode.

In an aspect of the present invention, if the selected monitoring mode is a preset mode, which is a mode in which a plurality of preset monitored areas are sequentially monitored, the pan motor and/or the tilt motor are driven such that the camera part passes through the plurality of monitored areas along a certain path, and when the standard positions of the pan motor and/or the tilt motor are not detected respectively by the pan sensor and/or the tilt sensor, and the pan sensor and/or the tilt sensor are driven such that the standard positions of the pan motor and/or the tilt motor are detected by the pan sensor and/or the tilt sensor, respectively.

In an aspect of the present invention, if the selected monitoring mode is an auto-panning mode, which is a mode for monitoring two preset monitored areas in reciprocal movement, the driving the pan motor and/or the tilt motor includes counting the number of reciprocal movement; comparing the counted number to a standard number of the reciprocal movement, which is preset; and when the counted number is equal to or greater than the standard number, driving the pan motor and/or the tilt motor such that the standard positions of the pan motor and/or the tilt motor are detected by the pan sensor and/or the tilt sensor, respectively.

In an aspect of the present invention, if the selected monitoring mode is a pattern mode, in which an operation pattern of the camera part, operated for a certain time and stored by the external controller, is performed, the driving the pan motor and/or the tilt motor includes counting the number of performing the operation pattern of the camera part operated according to the stored operation pattern; comparing the counted number of performing the operation pattern to a standard number of performing the operation pattern, which is preset; and when the counted number is equal to or greater than the standard number, driving the pan motor and/or the tilt motor such that the standard positions of the pan motor and/or the tilt motor are detected by the pan sensor and/or the tilt sensor, respectively.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
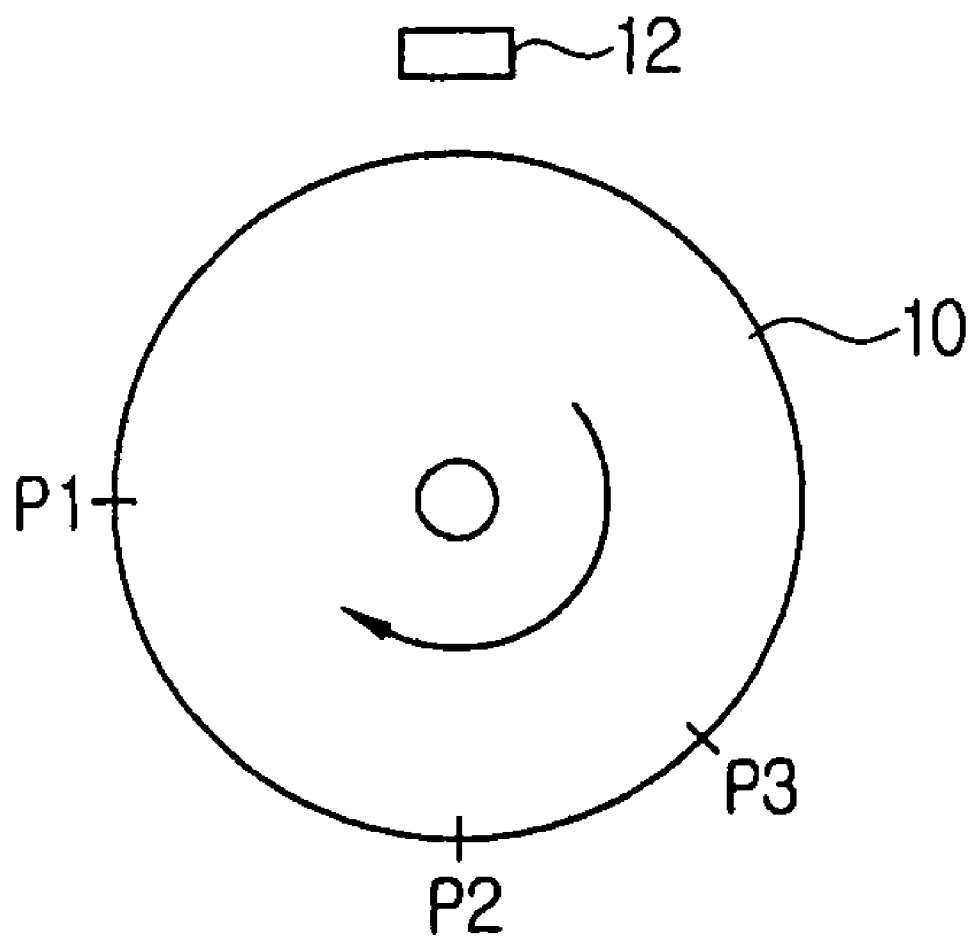
FIG. 1 illustrates a pan motor transversely rotating to detect a standard position, in a conventional dome camera.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
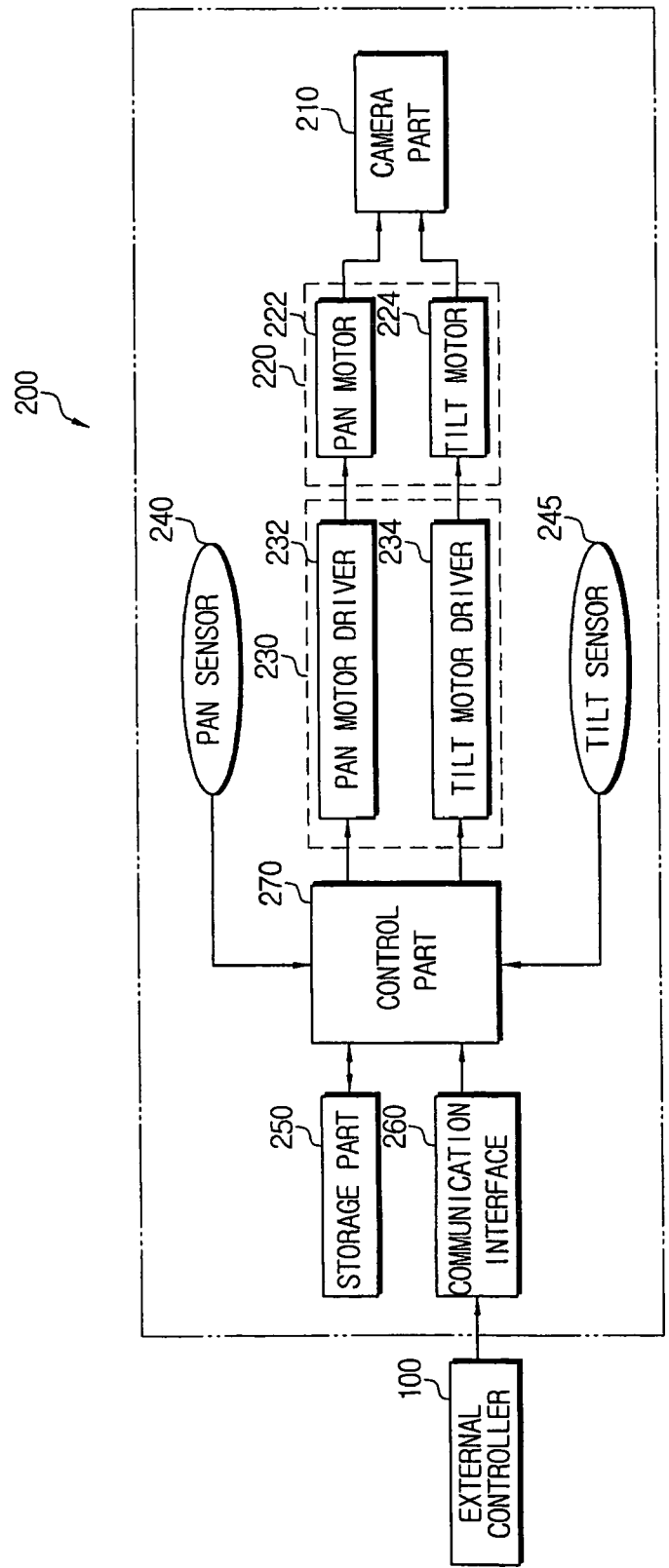
FIG. 2 is a block diagram schematically illustrating a surveillance camera capable of adjusting its position, according to an embodiment of the present invention.

FIG. 2 is a block diagram schematically illustrating a surveillance camera capable of adjusting its position, according to an embodiment of the present invention. Any further block diagrams and descriptions thereof will not be provided regarding other functions except a position adjusting function.

Referring to FIG. 2, a surveillance camera 200 according to an embodiment of the present invention comprises a camera part 210, a motor part 220, a motor driver 230, a pan sensor 240, a tilt sensor 245, a storage part 250, a communication interface 260 and a control part 270.

The surveillance camera 200 employed for a speed dome camera is connected to an external controller 100 such as a host computer through the communication interface 260, and a monitoring function thereof is controlled by a command from the external controller 100.

The motor part 220 comprises a pan motor 222 and a tilt motor 224. The pan motor 222 is connected to the camera part 210 to enable the camera part 210 to transversely rotate, that is, clockwise (CW) or counterclockwise (CCW), through a substantially 360-degree range. The tilt motor 224 is connected to the camera part 210 to enable the camera part 210 to perpendicularly rotate through a substantially 90-degree range.

The pan motor 222 and the tilt motor 224 are provided with a pan induction member (not shown) and a tilt induction member (not shown) to discern standard positions of the pan motor 222 and the tilt motor 224.

For the pan motor 222 and the tilt motor 224, a stepping motor capable of changing its speed may be used. The stepping motor is driven by the motor driver 230 which will be described hereinbelow.

The motor driver 230 comprises a pan motor driver 232 and a tilt motor driver 234, and drives the motor part 220 according to a control of the control part 270. More specifically, when employing the stepping motor for the motor part 220, the pan motor driver 232 and the tilt motor driver 234 adjust the rotating direction and the moving speed of the pan motor 222 and the tilt motor 224, according to a driving pulse and a driving control signal output from the control part 270, respectively, thereby adjusting the rotating direction and speed of the camera part 210.

The pan sensor 240 generates a regular magnetic field using a hall sensor that comprises a magnet. When the pan induction member (not shown) provided at the pan motor 222 is placed where the pan sensor 240 is mounted on a printed circuit board (PCB) while the pan motor 222 is rotated in a certain direction by the pan motor driver 232, magnetic flux is focused at the pan sensor 240. The pan sensor 240 outputs a standard position detection signal, indicating a detection of the pan induction member (not shown), to the control part 270.

The tilt sensor 245 operates in a similar way as the pan sensor 240 as described above. Therefore, how the standard position of the tilt motor 224 is detected will not be described. A distinctive feature is that the tilt sensor 245 comprises two sensors. The standard position of the tilt motor 224 is detected by one of the two sensors.

The communication interface 260 provides a path for communication of the surveillance camera 200 with the external controller 100 such as a host computer. According to an embodiment of the present invention, the external controller 100 is provided with a plurality of operation keys (not shown) to select a monitoring mode of the surveillance camera 200 and controlling the operation of the camera part 210. If a certain monitoring mode is selected by the external controller 100, a signal corresponding to the selected monitoring mode is transmitted to the control part 270 through the communication interface 260, thereby operating the surveillance camera 200 in the selected monitoring mode.

The storage part 250 stores by the respective monitoring mode a motor driving program that drives the pan motor 222 and the tilt motor 224. The monitoring mode may comprise any one of, or some combination of, an auto-panning mode, a preset mode, a pattern mode or a general monitoring mode, according to an embodiment of the present invention.

The auto-panning mode reciprocally monitors between two monitored areas preset by the external controller 100 and stored in the storage part 250.

The preset mode monitors a plurality of monitored areas preset by the external controller 100 and stored in the storage part 250 according to a predetermined order. More specifically, the preset mode monitors a current monitored area, moves to a next monitored area at a certain speed to monitor the next monitored area, and moves to another next monitored area at a certain speed to monitor the other next monitored area.

In the pattern mode, an operation pattern of the camera part 210, operated by the external controller 100 for a certain time, is stored in the storage part 250, and the camera part 210 is operated for a certain time corresponding to the stored operation pattern. For example, if the operation pattern of the camera part 210 is operated for 30 minutes using the external controller 100, the operation pattern for the 30 minutes is stored in the storage part 250 through the communication interface 260, and when the pattern mode is selected, the camera part 210 operates according to the operation pattern stored in the storage part 250.

In the general monitoring mode, when the operation pattern of the camera part 210 is operated by the external controller 100, the camera part 210 operates in real time according to the operation pattern.

The control part 270 controls overall operations of the surveillance camera 200 using a certain monitoring mode selected by the external controller 100 and the motor driving program pre-stored in the storage part 250.

Especially, when the certain monitoring mode is selected by the external controller 100, the control part 270 outputs a driving control signal corresponding to the selected monitoring mode to the pan motor driver 232 and/or the tilt motor driver 234, such that the standard positions of the pan motor 222 and the tilt motor 224 are detected by the pan sensor 240 and/or the tilt sensor 245 by a predetermined period set by the monitoring mode.

The control part 270 recognizes a current monitoring position of the camera part 210 according to a number of driving pulses, which correspond to the output driving control signal.

Accordingly, the pan motor driver 232 and the tilt motor driver 234 adaptively drive the pan motor 222 and/or the tilt motor 224, respectively, according to the driving control signal output from the control part 270.

Hereinbelow, a method of adjusting a position of the camera part 210 according to the selected monitoring mode using the control part 270 is described.

Figure 3:
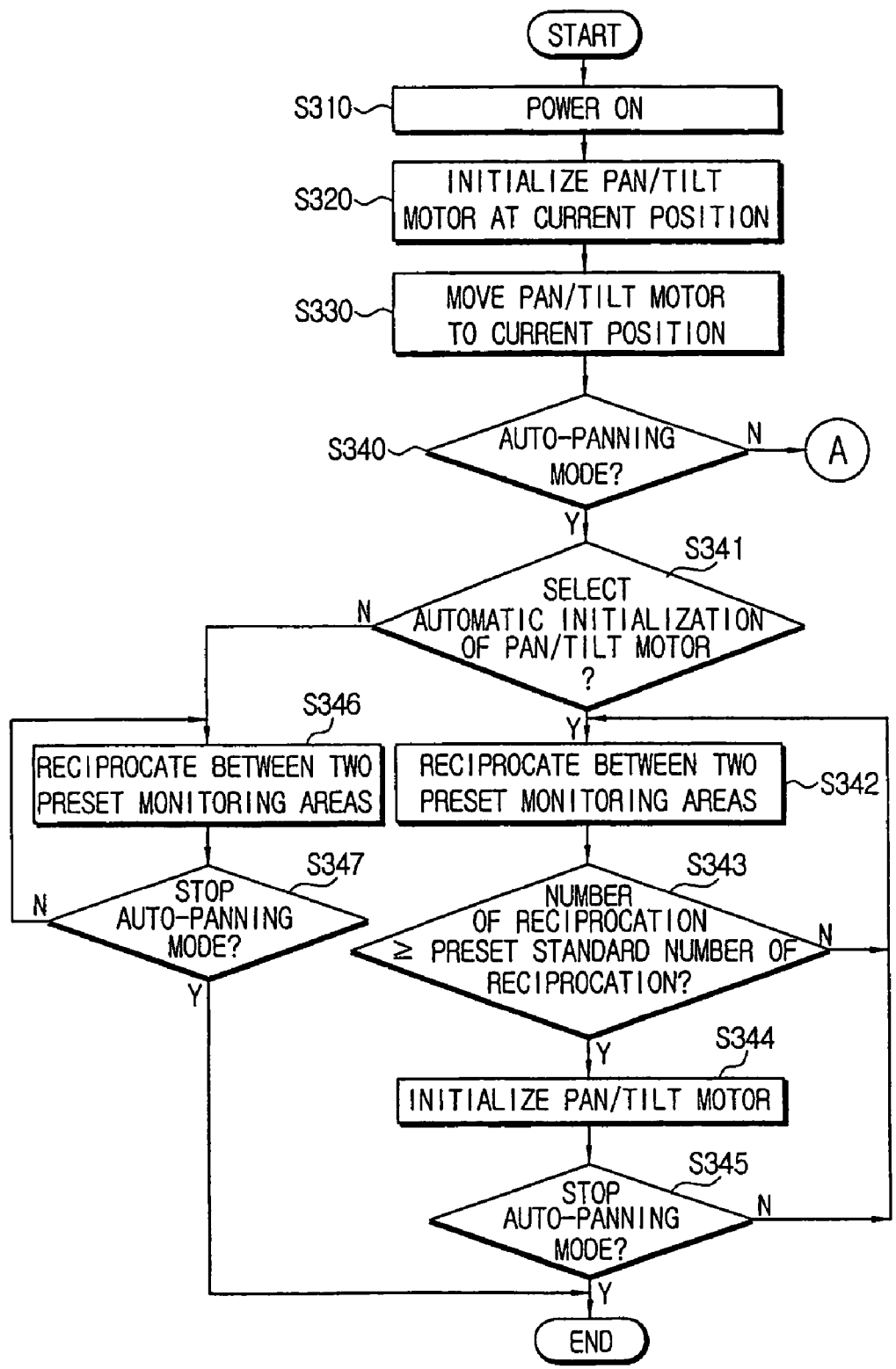
FIGS. 3 to 5 are flowcharts explaining a method of controlling the surveillance camera shown in FIG. 2.
Figure 4:
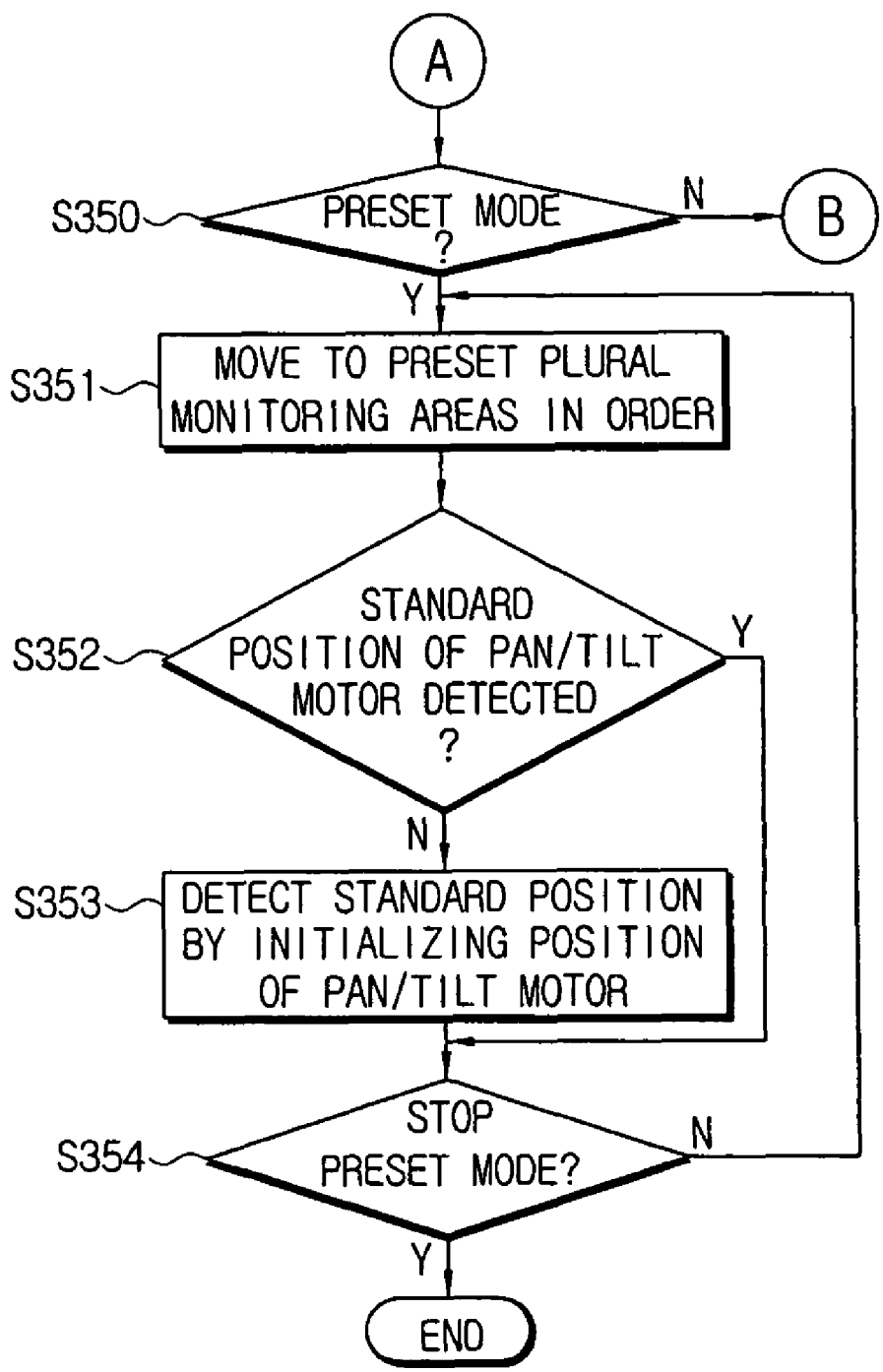
Figure 5:
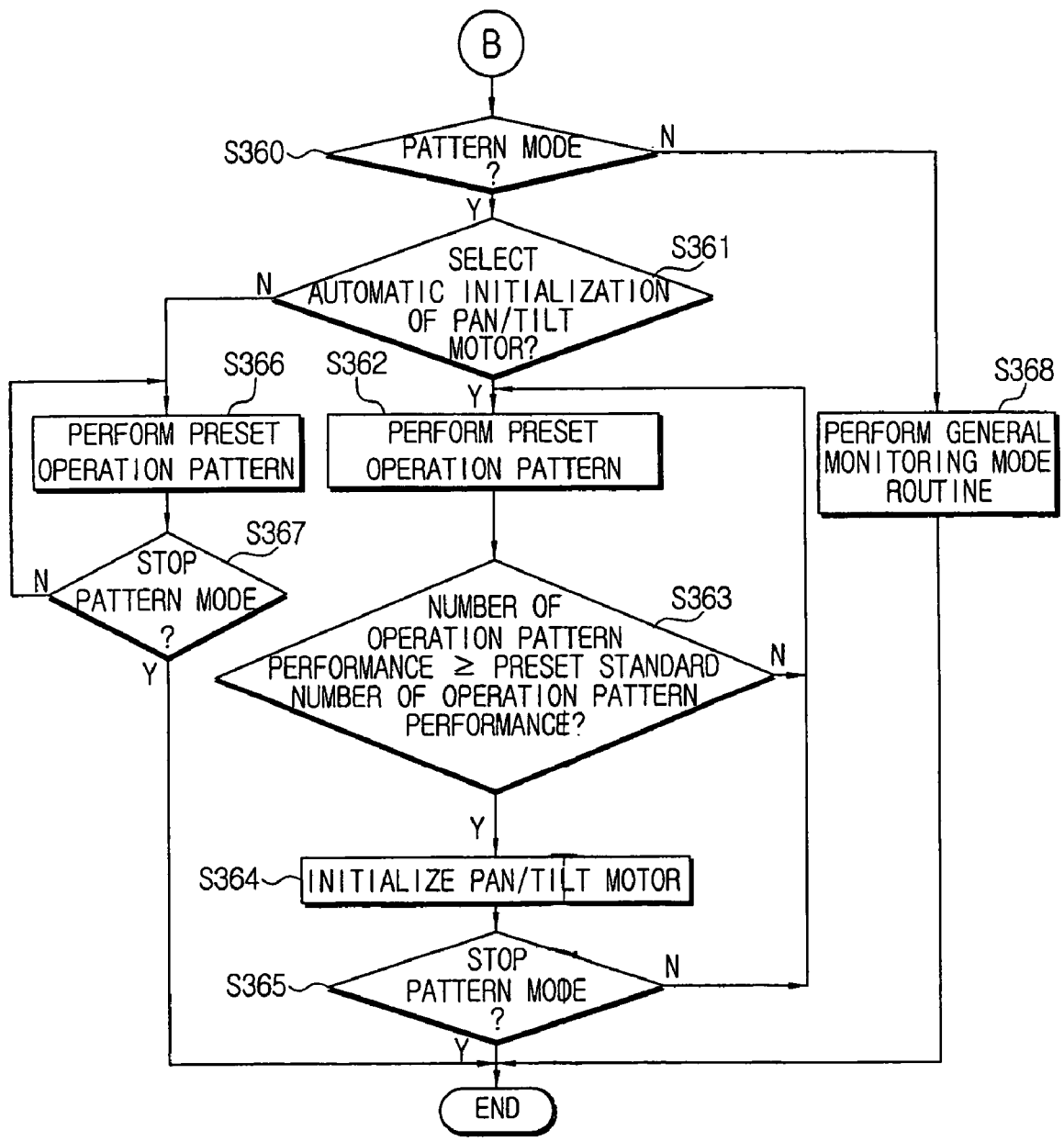

FIGS. 3 to 5 are flowcharts explaining a method of controlling the surveillance camera of FIG. 2, which is capable of position adjustment.

Referring to FIGS. 2 to 5, when the surveillance camera 200 is turned on in operation S310, the control part 270 outputs a driving control signal for position initialization of the pan motor 222 and/or the tilt motor 224 placed at a current position in operation S320. More specifically, the control part 270 outputs to the pan motor driver 232 a driving control signal to rotate the pan motor 222 from the current position in a certain direction, that is, CW or CCW, such that the pan induction member (not shown) provided at the standard position of the pan motor 222 is detected by the pan sensor 240. Also, the control part 270 outputs to the tilt motor driver 234 another driving control signal to rotate the tilt motor 224 from the current position in a certain vertical direction, that is, upward or downward, such that the tilt induction member (not shown) provided at the standard position of the tilt motor 224 is detected by the tilt sensor 245.

After operation S320, the control part 270 initializes the driving pulse counter to '0', and outputs a driving control signal to the pan motor driver 232 and/or the tilt motor driver 234 in order to move the pan motor 222 and/or the tilt motor 224 rotated in the certain direction to the current position in operation S330.

When the pan motor 222 and/or the tilt motor 224 are moved to the current position in operation S330, the control part 270 determines the monitoring mode selected by the external controller 100. If the selected monitoring mode is determined in operation S340 to be the auto-panning mode, which monitors between the preset two monitored areas by reciprocating motion, the control part 270 determines whether an automatic initialization mode of the pan motor 222 and/or the tilt motor 224 is selected by the external controller 100 in operation S341.

When it is determined that the automatic initialization mode is selected in operation S341, the control part 270 outputs a driving control signal such that the camera part 210 reciprocates between the two preset monitored areas in operation S342 and counts the number of reciprocal movement between the monitored areas. For example, if the preset two monitored areas are a current position P1 (FIG. 1) and a next position P2 (FIG. 1), and when the camera part 210 photographs or captures video images between the current position P1 and the next position P2, moving from the current position P1 to the next position P2 and back to the current position P1, is counted by the control part 270 as '1' reciprocal movement. In operation S342, the control part 270 also counts the number of the driving pulses according to the output driving control signal.

In operation S343, the control part 270 compares the counted number of reciprocal movements to a standard number, which is preset, of reciprocal movement, and outputs a driving control signal for position initialization of the pan motor 222 and/or the tilt motor 224 in operation S344 if the counted number is equal to or greater than the standard number. More specifically, the control part 270 outputs the driving control signal to the pan motor driver 232 and/or the tilt motor driver 234, such that the pan induction member (not shown) of the pan motor 222 and/or the tilt induction member (not shown) of the tilt motor 224 are detected by the pan sensor 240 and/or the tilt sensor 245.

If the standard position detecting signal, indicating the detection of the pan induction member and/or the tilt induction member, is received in operation S344, the control part 270 initializes the output driving pulse counter to '0'. According to this, an error of the positions of the pan motor 222 and/or the tilt motor 224, caused by loss of the driving pulse while performing operations S342 to S344, can be compensated, and the camera part 210 can correctly monitor the monitored area.

Until a stop signal stopping the operation of the auto-panning mode is received from the external controller 100 in operation S345, the control part 270 repeatedly performs operations S342 to S344.

In an alternate flow path of the control method, if it is determined that the automatic initialization mode is not selected in operation S341, the control part 270 outputs the driving pulse and the driving control signal, such that the camera part 210 reciprocates between the two monitored areas in operation S346 and no reinitialization occurs. When the stop signal stopping the operation of the auto-panning mode is received from the external controller 100, the control part 270 stops the auto-panning mode operation.

If the monitoring mode selected is not determined to be the auto-panning mode in operation S340, the control part 270 determines whether the selected monitoring mode is the preset mode, in which a plurality of preset monitored areas are sequentially monitored in operation S350. When the preset mode is determined to be selected, in operation S350, the control part 270 outputs the driving control signal so that the camera part 210 sequentially passes through the plurality of the preset monitored areas along a certain path, and also counts the number of the driving pulses in operation S351.

After operation S351, the control part 270 determines whether the standard positions of the pan motor 222 and/or the tilt motor 224 are detected by the pan sensor 240 and/or the tilt sensor 245 in operation S352 while the camera part 210 moves along the plurality of the monitored areas in sequential order. If the standard positions are not detected in operation S352, the control part 270 outputs the driving control signal for position initialization of the pan motor 222 and/or the tilt motor 224 in operation S353. More specifically, the control part 270 outputs to the pan motor driver 232 and/or the tilt motor driver 234 the driving control signal, such that the pan induction member (not shown) of the pan motor 222 and/or the tilt induction member (not shown) of the tilt motor 224 are respectively detected by the pan sensor 240 and/or the tilt sensor 245.

If the standard position detecting signal, indicating the detection of the pan induction member and/or the tilt induction member, is received in operation S353, the control part 270 initializes the output driving pulse counter to '0'. According to this, the position error of the pan motor 222 and/or the tilt motor 224, caused by loss of the driving pulse while moving from a first monitored area to a second monitored area at a certain speed in operation S351, can be compensated. Therefore, when moving from the second monitored area to a third monitored area to monitor the third monitored area, the camera part 210 can monitor the third monitored area more correctly.

Also, until a stop signal stopping the operation of the preset mode is received from the external controller 100 in operation S354, the control part 270 repeatedly performs operations S351 to S353.

If the monitoring mode selected is not determined to be the preset mode in operation S350, the control part 270 determines whether the selected monitoring mode is the pattern mode, in which the operation pattern of the camera 210 is performed, which is operated for a certain time and stored by the external controller 100 in operation S360. When the pattern mode is determined to be selected, in operation S360, the control part 270 determines whether the automatic initialization mode of the pan motor 222 and/or the tilt motor 224 is selected by the external controller 100 in operation S361.

When it is determined that the automatic initialization mode is selected in operation S361, the control part 270 outputs the driving control signal such that the camera part 210 operates corresponding to the operation pattern stored in the storage part 250 in operation S362, and counts the number of the driving pulses according to the number of times the camera 210 performs the operation pattern and the output driving control signal.

The control part 270 compares the counted number of performances of the operation pattern to a standard number of performances of the operation pattern in operation S363. If the counted number is equal to or greater than the standard number, the control part 270 outputs a driving control signal for position initialization of the pan motor 222 and/or the tilt motor 224 in operation S364. More specifically, the control part 270 outputs the driving control signal to the pan motor driver 232 and/or the tilt motor driver 234, such that the pan induction member (not shown) of the pan motor 222 and/or the tilt induction member (not shown) of the tilt motor 224 are detected by the pan sensor 240 and/or the tilt sensor 245 to determine if the pan motor 222 and/or the tilt motor 224 are in the standard position.

If the standard position detecting signal, indicating the detection of the pan induction member and/or the tilt induction member, is received in operation S364, the control part 270 initializes the output driving pulse counter to '0'. Until a stop signal stopping the operation of the pattern mode is received from the external controller 100 in operation S365, the control part 270 repeatedly performs operations S362 to S364.

If it is determined that the automatic initialization mode is not selected in operation S361, the control part 270 outputs the driving pulse and the driving control signal, such that the camera part 210 operates in accordance with the operation pattern stored in the storage part 250 in operation S366. When the stop signal stopping the operation of the pattern mode is received from the external controller 100, the control part 270 stops the pattern mode operation.

If the monitoring mode selected is not determined to be the pattern mode in operation S360, the control part 270 performs the general monitoring mode in operation S368. After selecting the general monitoring mode, when an operation signal for the operation pattern of the camera part 210 is received by the external controller 100, the control part 270 outputs the driving control signal corresponding to the received operation signal for the operation pattern.

The standard number of the reciprocal movement, preset in steps S343 and S363, can be changed by the external controller 100. The standard numbers of before and after the change are preferably, but not required to be, stored in the storage part 250.

In the surveillance camera 200 as described above, various controlling devices are applicable for the external controller 100. For example, the host computer, a remote controller that transmits a wireless signal such as an infrared beam, or a joystick may be used for the external controller 100. When the monitoring operation is controlled by the external controller 100, a light-receiving part which receives the wireless signal may be applied for the communication interface 260.

As can be appreciated from the above description of the surveillance camera and the controlling method thereof according to an embodiment of the present invention, the position error of the pan motor 222 and the tilt motor 224, induced by loss of the driving pulse generated during the operation of the pan motor 222 and the tilt motor 224, can be adaptively adjusted. Especially, the monitored area can be monitored more completely and consistently, by setting whether to select the position initialization of the pan motor 222 and the tilt motor 224 according to the certain monitoring modes and setting the initialization period.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A surveillance apparatus driving a camera part, the surveillance apparatus comprising:
    a communication interface which receives a monitoring mode signal indicating a monitoring mode;
    a motor which moves the camera part;
    a sensor which detects a standard position of the motor to initialize a position of the motor;
    a control part which:
        outputs a first control signal rotating the motor to move the camera part for capturing an image of a monitored site according to the monitoring mode; and
        if a given condition set for the monitoring mode is satisfied while the motor is being rotated by the first control signal for the capturing the image of the monitored site, outputs a second control signal initializing the position of the motor by rotating the motor from an instant position such that the standard position of the motor is detected by the sensor; and
    a motor driver which moves the motor according to the first control signal and the second control signal,
    wherein, if the standard position of the motor is detected by the sensor, the control part outputs a third control signal to the motor drive to rotate the motor back to the instant position to continue the capturing the image of the monitored site from the instant position according to the monitoring mode.

2. The surveillance apparatus of claim 1, wherein the monitoring mode is selected from among a plurality of monitoring modes which move the camera part in respectively different patterns, and the given condition is differently set for each of the plurality of monitoring modes.

3. The surveillance apparatus of claim 1, wherein the monitoring mode is one of:
    a preset mode according to which the camera part is moved to monitor a plurality of areas sequentially, and for which the set given condition is whether the standard position of the motor is not detected by the sensor in a given period;
    an auto-panning mode according to which the camera part is moved to monitor two areas through a reciprocal movement and the control part counts a number of the reciprocal movement, and for which the set given condition is whether the counted number of the reciprocal movement is equal to or greater than a standard number for the auto-panning mode; and
    a pattern mode according to which the camera part is moved to perform a stored operation pattern and the control part counts a number of times the stored operation pattern is performed, and for which the set given condition is whether the counted number of times the stored operation pattern is performed is equal to or greater than a standard number for the pattern mode.

4. The surveillance apparatus of claim 1, wherein the first control signal output from the control part comprises driving pulses, a number of which increases according to an amount of rotation of the motor, and
    wherein the control part counts the number of the driving pulses when the motor is rotated by the first control signal to move the camera part for the capturing the image of the monitored site, thereby recognizing a position of the camera part corresponding to the instant position of the motor, and initializes the number of the driving pulses to "0" for the initializing the position of the motor.

5. The surveillance apparatus of claim 4, wherein the control parts is configured to determine if the standard position of the motor is detected while the motor is being rotated by the first control signal for the capturing the image of the monitored site, and
    wherein if it is determined that the standard position of the motor is detected while the motor is being rotated by the first control signal for the capturing the image of the monitored site, the control part initializes the number of the driving pulses to "0" from which the number of driving pulses increases.

6. The surveillance apparatus of claim 1, wherein the motor is one of a pan motor which rotates the camera part in a horizontal direction, and a tilt motor which rotates the camera part in a vertical direction.

7. The surveillance apparatus of claim 1, wherein, when the surveillance apparatus is turned on, the control part rotates the motor from a current position maintained before the surveillance apparatus is turned on, for firstly initializing the position of the motor, such that the standard position of the motor is detected by the sensor, and wherein if the standard position of the motor is detected, the control part outputs the third control signal to the motor driver to rotate the motor back to the current position.

8. The surveillance apparatus of claim 7, wherein the first control signal output from the control part comprises driving pulses, a number of which increases according to an amount of rotation of the motor, wherein the control part counts the number of the driving pulses when the motor is rotated by the first control signal to move the camera part for the capturing the image of the monitored site, thereby recognizing a position of the camera part corresponding to the instant position of the motor, and initializes the number of the driving pulses to "0" for the initializing the position of the motor, and wherein, when the surveillance apparatus is turned on, the control part initializes the number of the driving pulses to "0" for the firstly initializing the position by rotating the motor from the current position, maintained before the surveillance apparatus is turned on, such that the standard position of the motor is detected by the sensor.

9. The method of claim 8, wherein the first control signal comprises driving pulses, a number of which increases according to an amount of rotation of the motor, the method further comprising:

counting the number of the driving pulses when the motor is rotated by the first control signal to move the camera part for the capturing the image of the monitored site, thereby recognizing a position of the camera part corresponding to the instant position of the motor; and initializing the number of the driving pulses to "0" for the initializing the position of the motor, and when the surveillance apparatus is turned on, initializing the number of the driving pulses to "0", for the firstly initializing the position of the motor, by rotating the motor from the current position, maintained before the surveillance apparatus is turned on, such that the standard position of the motor is detected by the sensor.

10. A method of controlling a surveillance apparatus comprising a motor to drive a camera part, the method comprising:

receiving a monitoring mode signal indicating a monitoring mode;

outputting a first control signal rotating the motor to move the camera part for capturing an image of a monitored site according to the monitoring mode;

if a given condition set for the monitoring mode is satisfied while the motor is rotated by the first control signal for the capturing the image of the monitored site, outputting a second control signal initializing a position of the motor by rotating the motor from an instant position such that a standard position of the motor is detected by a sensor of the motor; and if the standard position of the motor is detected by the sensor, outputting a third control signal to rotate the motor back to the instant position to continue the capturing the image of the monitored site according to the monitoring mode.

11. The method of claim 10, wherein the monitoring mode is selected from among a plurality of monitoring modes which move the camera part in respectively different patterns, and the given condition is differently set for each of the plurality of monitoring modes.

12. The method of claim 10, wherein the monitoring mode is one of:

a preset mode according to which the camera part is moved to monitor a plurality of areas sequentially, and for which the set given condition is whether the standard position of the motor is not detected by the sensor in a given period;

an auto-panning mode according to which the camera part is moved to monitor two areas through a reciprocal movement and the control part counts a number of the reciprocal movement, and for which the set given condition is whether the counted number of the reciprocal movement is equal to or greater than a standard number for the auto-panning mode; and a pattern mode according to which the camera part is moved to perform a stored operation pattern and the control part counts a number of times the stored operation pattern is performed, and for which the set given condition is whether the counted number of times the stored operation pattern is performed is equal to or greater than a standard number for the pattern mode.

13. The method of claim 10, wherein the first control signal comprises driving pulses, a number of which increases according to an amount of rotation of the motor, the method further comprising:

counting the number of the driving pulses when the motor is rotated by the first control signal to move the camera part for the capturing the image of the monitored site, thereby recognizing a position of the camera part corresponding to the instant position of the motor; and initializing the number of the driving pulses to "0" for the initializing the position of the motor.

14. The method of claim 13, further comprising:

determining if the standard position of the motor is detected while the motor is being rotated by the first control signal for the capturing the image of the monitored site; and if it is determined that the standard position of the motor is detected while the motor is being rotated by the first control signal for the capturing the image of the monitored site, initializing the number of the driving pulses to "0" from which the number of driving pulses increases.

15. The method of claim 10, wherein the motor is one of a pan motor which rotates the camera part in a horizontal direction, and a tilt motor which rotates the camera part in a vertical direction.

16. The method of claim 10, wherein, when the surveillance apparatus is turned on, rotating the motor from a current position maintained before the surveillance apparatus is turned on, for firstly initializing the position of the motor, such that the standard position of the motor is detected by the sensor, and wherein if the standard position of the motor is detected, outputting the third control signal to rotate the motor back to the current position.

17. A surveillance apparatus driving a camera part, the surveillance apparatus comprising:

a communication interface which receives a monitoring mode signal indicating a selected monitoring mode from among a plurality of monitoring modes which move the camera part in respectively different patterns;

a pan motor which moves the camera part in a horizontal direction, and a pan sensor which detects a standard position of the pan motor to initialize a position of the pan motor;

a tilt motor which moves the camera part in a vertical direction, and a tilt sensor which detects a standard position of the tilt motor to initialize a position of the tilt motor;

a control part which:

outputs a first control signal rotating at least one of the pan motor and the tilt motor to move the camera part for capturing an image of a monitored area according to the selected monitoring mode; and if a given condition set for the selected monitoring mode is satisfied while the at least one of the pan motor and the tilt motor is rotated by the first control signal for the capturing the image of the monitored area, outputs a second control signal initializing the position of the at least one of the pan motor and the tilt motor by rotating the at least one of the pan motor and the tilt motor from a respective instant position such that at least one of the standard positions of the pan motor and the tilt motor is detected by at least one of the pan sensor and the tilt sensor, respectively; and a motor driver which moves the at least one of the pan motor and the tilt motor according to the first control signal and the second control signal, wherein, if the at least one of the standard positions is detected by the at least one of the pan sensor and the tilt sensor, the control part outputs a third control signal to the motor drive to rotate the at least one of the pan motor and the tilt motor back to the respective instant position to continue the capturing the image of the monitored site from the respective instant position according to the monitoring mode.

18. The surveillance apparatus of claim 17, when the surveillance apparatus is turned on, the control part moves the at least one of the pan motor and the tilt motor from a respective current position maintained before the surveillance apparatus is turned on, for firstly initializing the position of the at least one of the pan motor and the tilt motor, such that the at least one of the standard positions of the pan motor and the tilt motor is detected by the at least one of the pan sensor and the tilt sensor, respectively, and wherein if the at least one of the standard positions is detected, the control part outputs a third driving control signal to the motor driver such that the at least one of the pan motor and the tilt motor, which standard position is detected, is moved back to the respective current position.

19. A method of controlling a surveillance apparatus comprising at least one of a pan motor and a tilt motor to drive a camera part, the method comprising:

receiving a monitoring mode signal indicating a selected monitoring mode;

outputting a first control signal rotating the at least one of the pan motor and the tilt motor to move the camera part for capturing an image of a monitored site according to the monitoring mode;

outputting, if a given condition set for the monitoring mode is satisfied, a second control signal initializing a position of the at least one of the pan motor and the tilt motor by rotating the at least one of the pan motor and the tilt motor from a respective instant position, while the at least one of the pan motor and the tilt motor is rotated by the first control signal for the capturing the image of the monitored site, such that at least one of standard positions of the at least one of the pan motor and the tilt motor is detected by at least one of a pan sensor and a tilt sensor; and if the at least one of the standard positions is detected by the at least one of the pan sensor and the tilt sensor, outputting a third control signal to rotate the at least one of the pan motor and the tilt motor back to the respective instant position to continue the capturing the image of the monitored site from the respective instant position according to the monitoring mode.

20. The method of claim 19, further comprising:

when the surveillance camera is turned on, moving the at least one of the pan motor and the tilt motor from a respective current position maintained before the surveillance apparatus is turned on, for firstly initializing the position of the at least one of the pan motor and the tilt motor, such that the at least one of the standard positions of the at least one of the pan motor and the tilt motor is detected by the at least one of the pan sensor and the tilt sensor, respectively, and wherein if the at least one of the standard positions is detected, outputting a third driving control signal to move the at least one of the pan motor and the tilt motor, which standard position is detected, back to the respective current position.

* * * * *